United States Patent [19]

I'Anson

[11] Patent Number: 5,329,519
[45] Date of Patent: Jul. 12, 1994

[54] LAN MONITORING METHOD AND APPARATUS

[75] Inventor: Colin S. I'Anson, Bristol, England

[73] Assignee: Hewlett Packard Company, Palo Alto, Calif.

[21] Appl. No.: 66,141

[22] PCT Filed: Nov. 6, 1991

[86] PCT No.: PCT/GB91/01952
§ 371 Date: Jul. 1, 1993
§ 102(e) Date: Jul. 1, 1992

[87] PCT Pub. No.: WO92/10896
PCT Pub. Date: Jun. 25, 1992

[30] Foreign Application Priority Data

Dec. 7, 1990 [EP] European Pat. Off. ........ 90313320.5

[51] Int. Cl.⁵ .......................... H04J 3/14; H04L 12/28
[52] U.S. Cl. .................................... 370/13; 370/85.3; 370/94.1

[58] Field of Search ........... 370/13, 14, 17, 85.1-85.3, 370/85.15, 60, 94.1, 94.3; 371/20.1, 29.1; 340/825.06, 825.17

[56] References Cited

U.S. PATENT DOCUMENTS

| 4,779,088 | 10/1988 | Restrepo | 370/85.2 |
| 4,916,694 | 4/1990 | Roth | 370/17 |
| 5,012,467 | 4/1991 | Crane | 370/85.3 |
| 5,185,735 | 2/1993 | Ernst | 370/13 |
| 5,267,237 | 11/1993 | Townley | 370/85.3 |

Primary Examiner—Douglas W. Olms
Assistant Examiner—Hassan Kizou

[57] ABSTRACT

A monitoring device detects late packet collision on a CSMA/CD LAN. The device comprises a first detector for detecting the presence of a packet in the LAN, a second detector for detecting the occurrence of a packet collision in the LAN and a late collision indicator which provides a late collision indication whenever the second detector detects the occurrence of a collision more than a predetermined time after the first detector detects the presence of a packet.

8 Claims, 2 Drawing Sheets

LAN MONITORING METHOD AND APPARATUS

TECHNICAL FIELD

The present invention relates to a method and apparatus for monitoring packet-based LANs (local area networks) that utilize the media access control method known as CSMA/CD (Carrier Sense Multiple Access with Collision Detection).

BACKGROUND ART

As is well known, in a CSMA/CD LAN a number of stations are interconnected through a single shared cable (electrical or optical) logically configured as a bus (though possibly physically configured as a bus, tree or star). Data is transmitted between the stations in packets and generally signals are normally only present on the LAN when user data or control data is being transferred (that is, the LAN is idle—no signals present—in the gaps between packets). A station wishing to transmit data first checks that the LAN has been idle long enough for all transmissions to have propagated across the LAN; providing this check shows the LAN to be idle, the station then proceeds to transmit its data. It is, of course, still possible for two stations to start transmission at approximately the same instant and in this case there will be a collision between the two packets being transmitted. Each transmitting station listens out for any such collision and if one does occur, the station erases transmission after having first transmitted a jam sequence that ensures the collision is detected by all the stations concerned. The stations responsible for transmitting the colliding packets will then attempt to retransmit their data after a short, random, delay.

If the LAN is functioning correctly, collisions should only occur within a predetermined time interval following the start of transmission by any particular station. The duration of this time interval is dependent on the longest propagation delay between any pair of stations on the network (or where the network is made up of several segments interconnected by repeaters, between any pair of stations on the relevant network segment), the time taken by a station to launch a packet, and the time taken for a station to detect a collision. In practice, where a LAN is designed in accordance with a particular technical standard, this predetermined time interval will normally be determined with reference to the maximum values of the defining parameters as set down in the technical standard.

In some LAN fault conditions, packet collisions may occur after the initial time interval where such collisions are expected. It is possible to observe such collisions using network analyzers; however, such items of equipment are expensive and complex, requiring much skill to set them up to observe late collisions.

It is an object of the present invention to provide a method and apparatus that facilitate the monitoring of late collisions on CSMA/CD LANs.

DISCLOSURE OF THE INVENTION

According to one aspect of the present invention, there is provided apparatus for monitoring a CSMA/CD LAN, the said apparatus comprising:

input means for providing a connection to the LAN to enable monitoring of the LAN whilst operational;

first detection means coupled to the input means and operative to detect the presence of a packet on the LAN and to generate a first output signal in response thereto;

second detection means coupled to the input means and operative to detect a packet collision on the LAN and to generate a second output signal in response thereto; and late-collision indicator means connected to receive the first and second output signals and operative to provide a late-collision output indication when the second output signal indicates the occurrence of a packet collision subsequent to the elapse of a predetermined time interval from the start of the last preceding packet as indicated by the first output signal.

The late-collision output indication, which is preferably a visual output, enables a user of the apparatus to readily discern the presence of late collisions and therefore of a fault on the LAN.

Advantageously, the late-collision detector means comprises timing means operative to generate an inhibit signal in response to said first output signal indicating the start of a packet on the LAN, said inhibit signal having a duration, from the time said first output signal indicates the start of the last preceding packet, corresponding to said predetermined time interval; and gating means connected to receive said second output signal and said inhibit signal and operative to provide a late-collision signal only when said inhibit signal is absent concurrently with said second output signal being present; the late-collision signal provided by said gating means being used to provide said late-collision output indication. The timing means may be a re-triggerable monostable.

Preferably, the late-collision detector means further comprises an output latch connected to receive the said late-collision signal from the gating means, said output latch being operative to latch said late-collision signal on receipt and to thereupon provide said late-collision output indication.

For monitoring LANs that employ a transmission medium adapted to carry electrical signals, the apparatus may be designed such that said first detection means is operative to provide said first output signal when the voltage on the LAN exceeds a first predetermined voltage magnitude; and said second detection means is operative to provide said second output signal when the voltage in the LAN exceeds a second predetermined voltage magnitude, greater than said first predetermined magnitude.

The apparatus may advantageously be provided in hand-portable form to permit user to move quickly between test locations. Furthermore, the said predetermined time interval that determines whether or not a collision is classed as a late collision, may be made adjustable.

According to another aspect of the present invention, there is provided a method of monitoring a CSMA/CD LAN, the method comprising the steps of detecting the presence of a packet on the LAN and providing a first output signal in response thereto; detecting a packet collision on the LAN and providing a second output signal in response thereto; and providing a late-collision output indication when said second output signal indicates the occurrence of a packet collision subsequent to the elapse of a predetermined time interval from the start of the last preceding packet as indicated by said first output signal.

BRIEF DESCRIPTION OF THE DRAWINGS

A hand-portable LAN monitoring device embodying the invention will now be particularly described, by way of non-limiting example, with reference to the accompanying diagrammatic drawings, in which.

BEST MODE FOR CARRYING OUT THE INVENTION

Figure 1:
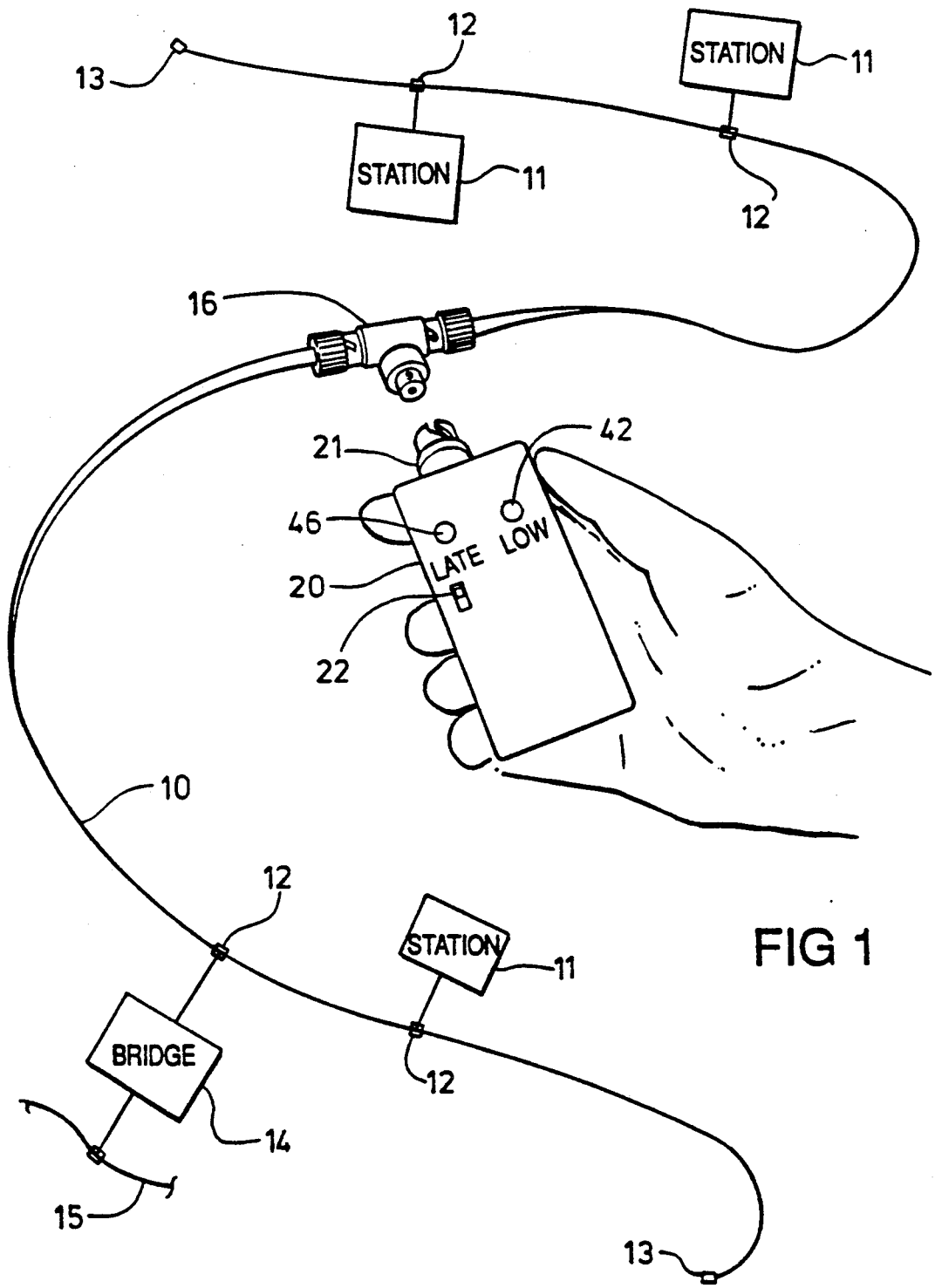
FIG. 1 illustrates generally how the monitoring device is used to monitor a LAN.

FIG. 1 illustrates a LAN segment the transmission medium of which is constituted by a coaxial cable 10. A number of computer workstations 11 are connected to the cable 10 via connectors 12. The ends of the cable 10 are terminated by terminators 13 which match the characteristic impedance of the cable 10.

The illustrated LAN is, for example, a CSMA/CD LAN complying with the 10BASE5 variant of the IEEE 802.3 standard. In this case, the characteristic impedance of the coaxial cable 10 is 50 ohms and the terminators 13 can be simply constituted by 50 ohm resistors connected between the inner conductor and the outer shield of the cable. The signalling technique used is baseband with Manchester encoding and with a data rate of 10 megabits/second.

In transmitting packets over the LAN cable, the stations output pulse signals which have negative voltage excursions relative to the voltage of the cable between the packets (in this case, zero volts).

The LAN segment may be connected to one or more other LAN segments 15 via connectors 12 and one or more appropriate spanning devices such as the bridge 14.

Also illustrated in FIG. 1 is the hand-portable LAN monitoring device 20. This device is battery powered and is provided with a coaxial-cable connector 21 for connecting the device to the cable 10 through a T-junction cable connector 16. Such connectors are generally to be found throughout the length of the LAN segment cable 10 and can serve as the connectors 12. When not providing a connection to the cable 10, the connector 16 has its unconnected stub left not terminated.

As can be seen in FIG. 1, the monitoring device 20 includes a power on/off switch 22, a first LED (light emitting diode) indicator 42 marked "LOW" for indicating low traffic conditions, and a second LED indicator 46 marked "LATE" for indicating late collisions on the LAN.

Figure 2:
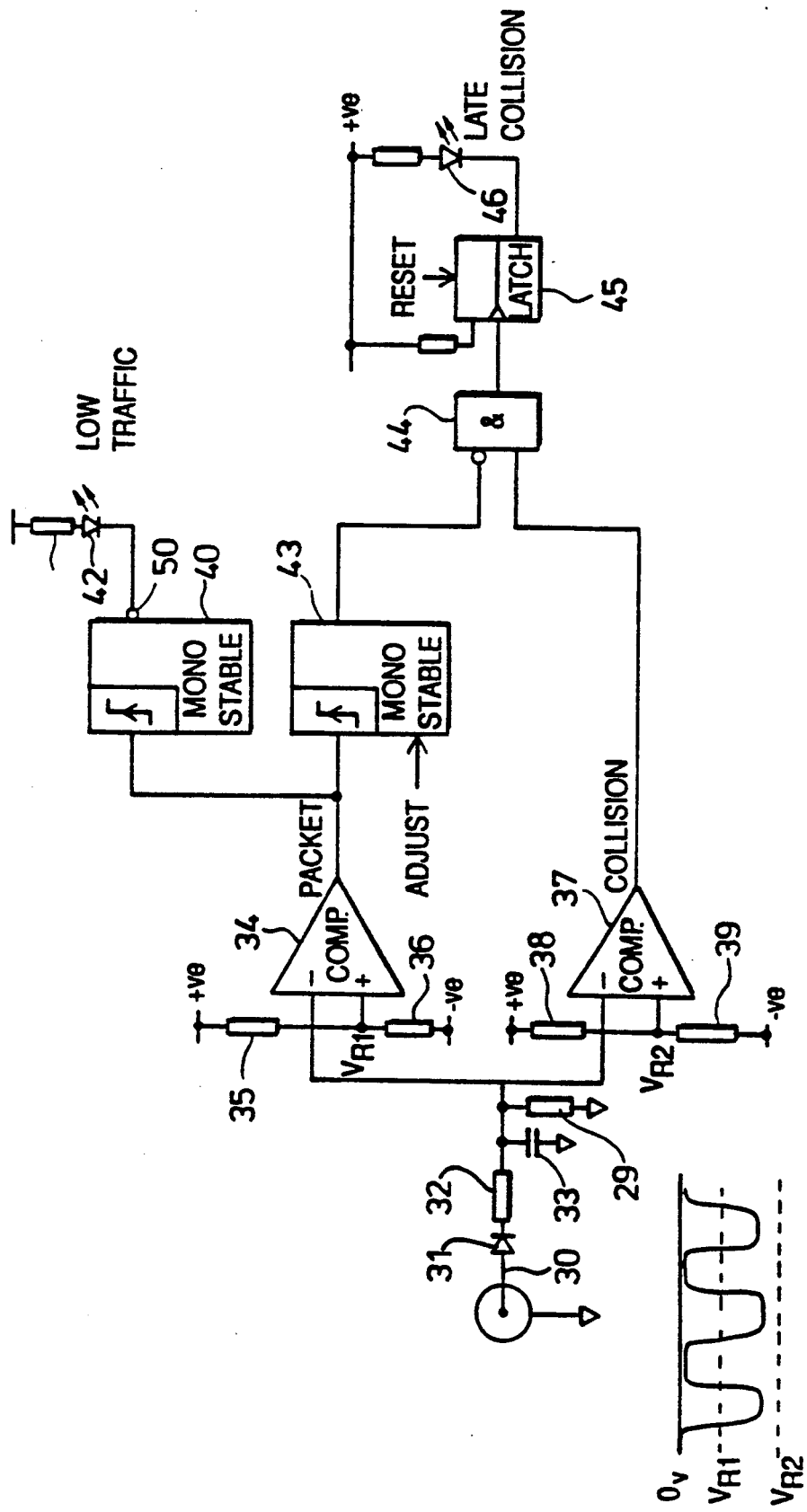
FIG. 2 is a schematic diagram of the monitoring circuitry of the monitoring device.

The internal circuitry of the monitoring device 20 is shown in FIG. 2. Upon connection of the monitoring device 20 to the LAN cable 10 via the connectors 21 and 16, the voltage of the inner conductor of the cable 10 appears on an input line 30 of the FIG. 2 circuitry. This voltage is fed to a short-term averaging circuit formed by a diode 31, resistor 32, capacitor 33 and resistor 29; the values of these components are chosen such that the voltage of the capacitor 33 tracks the envelope of the data packets appearing on the cable 10 rather than the individual pulses within the packet.

The voltage of the capacitor 33 is supplied to the "−" inputs of comparators 34 and 37, the "+" inputs of which are respectively supplied with a reference voltage $V_{R1}$ generated by a chain of resistors 35, 36, and a voltage $V_{R2}$ generated by a chain of resistors 38, 39. Reference voltage $V_{R1}$ is set at a level less negative than the envelope of a single data packet whereby the output of the comparator 34 will go high in the presence of a data packet on the LAN but will otherwise be low. Reference voltage $V_{R2}$ is set such that it is more negative than the voltage envelope of a single packet but is less negative than the voltage envelope produced when two packets collide; the output of the comparator 37 will thus normally be low but go high upon the occurrence of a collision and remain high while the collision continues.

The output of the comparator 34 thus indicates the presence of a packet while the output of the comparator 37 indicates the presence of a collision.

The output of the comparator 34 is fed to a monostable 43 triggered off the positive going edge of the pulse produced at the output of the comparator 34 when a packet is present on the LAIN. The monostable 43 produces a positive pulse of a duration corresponding to the time interval after the start of a packet when a valid collision may occur. The parameters effecting the value of this time interval have already been mentioned above and the monostable is preferably such that the duration of this output pulse can be adjusted appropriately for different LANs.

By using the signals present at the output of the monostable 43 and at the output of the comparator 37, it is a simple matter to generate a signal indicative of the presence of a late collision of the LAN. More particularly, this can be achieved by feeding the output comparator 37 to a normal input of an AND gate 44 whilst feeding the output of the monostable 43 to an inverting input of the same AND gate 44. The gate 44 will thus be inhibited for the valid-collision time interval that follows that start of each packet of the LAN; beyond this valid-collision time interval, the output of the monostable 43 serves to enable the gate 44 so that should a collision subsequently occur whilst the currently detected packet is still present, then the collision signal output by the comparator 37 will be past through the gate 44. This signal is then latched by latch 45. In its latched state, the latch 45 activates a visual output in the form of an LED (light emitting diode) 46 to thereby indicate to the user of the monitoring device the occurrence of a late collision on the LAN.

In addition to providing an indication of a late collision on the LAN, the monitoring device circuitry can be arranged to provide a low traffic indication. To this end, the output of the comparator 34 is fed to a monostable 40 which effectively acts as a pulse stretcher. Upon the comparator 34 producing an output pulse indicating the presence of a packet on the LAN (this pulse having a duration substantially corresponding to that of the packet), the monostable 40 is triggered to produce a corresponding low output pulse at a normally-high inverting output 50. The duration of this output pulse is many times greater than that of the packet giving rise to the pulse and is, for example, 100 milliseconds. This extended pulse is used to energize an LED (light emitting diode) 42 to provide the operator with a visual indication of the presence of a single packet on the LAN (the duration of the pulse being chosen to ensure visual discernability by a user). When the traffic on the LAN is low, the LED 42 will be seen to flicker; however, in the presence of normal high traffic on the LAN the LED will be continually energized. This simple visual indication of low traffic can be an extremely useful tool in tracking down LAN faults.

Various modifications to the described circuitry will be apparent to persons skilled in the art. Thus for example, the latch 45 may be replaced by a monostable operative to give an extended output pulse so that the presence of a late collision will be seen by the user of the monitoring device as a fixed duration energization of the LED 46.

A possible modification to the low traffic indicator would be to use a non-inverting output from the monostable 40 such that in the absence of traffic the LED 42 would be continuously energized, in the presence of low traffic the LED would flicker, while during normal traffic the LED would be de-energized. Another possible modification would be to use the output of the monostable 40 to gate the output of a sound source in order to produce an audibly discernible indicator of low traffic rather than a visual one (it will be appreciated that the duration of the extended pulse used to ensure user discernability of a single packet may be different where a sound source is used in place of an LED).

Although the illustrated monitoring device is intended for use with a coaxial cable, baseband LAN, it will be apparent to persons skilled in the art that similar monitoring devices could be made for LANs including optical cables or for LANs using broadband signalling techniques rather than baseband techniques.

Furthermore, whilst the monitoring device described above is of hand-portable form, the device could also be provided as a card for insertion into a station 11 or spanning device 14.

I claim:

1. Apparatus for monitoring a CSMA/CD LAN, said apparatus comprising:
   input means for providing a connection to said LAN to enable monitoring of the LAN whilst operational;
   first detection means coupled to said input means and operative to detect the presence of a packet on the LAN and to generate a first output signal in response thereto;
   second detection means coupled to said input means and operative to detect a packet collision on the LAN and to generate a second output signal in response thereto; and
   late-collision indicator means connected to receive said first and second output signals and operative to provide a late-collision output indication when said second output signal indicates the occurrence of a packet collision subsequent to the elapse of a predetermined time interval from the start of the last preceding packet as indicated by said first output signal.

2. Apparatus according to claim 1, wherein said late-collision indicator means comprises:
   timing means operative to generate an inhibit signal in response to said first output signal indicating the start of a packet on the LAN, said inhibit signal having a duration, from the time said first output signal indicates the start of the last preceding packet, corresponding to said predetermined time interval; and
   gating means connected to receive said second output signal and said inhibit signal and operative to provide a late-collision signal only when said inhibit signal is absent concurrently with said second output signal being present; the late-collision signal provided by said gating means being used to provide said late-collision output indication.

3. Apparatus according to claim 2, wherein said timing means is a re-triggerable monostable element.

4. Apparatus according to claim 2, wherein the late-collision indicator means further comprises an output latch connected to receive the said late-collision signal from the gating means said output latch being operative to latch said late-collision signal on receipt and to thereupon provide said late-collision output indication.

5. Apparatus according to claim 1, wherein said late-collision indicator means includes means for adjusting the duration of said predetermined time interval.

6. Apparatus according to claim 1 for use with a LAN that employs a transmission medium adapted to carry electrical signals, wherein:
   said first detection means is operative to provide said first output signal when the voltage on the LAN exceeds a first predetermined voltage magnitude; and
   said second detection means is operative to provide said second output signal when the voltage in the LAN exceeds a second predetermined voltage magnitude, greater than said first predetermined magnitude.

7. Apparatus according to claim 1 in the form of a hand-held instrument.

8. A method of monitoring a CSMA/CD LAN, the method comprising the steps of:
   detecting the presence of a packet on the LAN and providing a first output signal in response thereto;
   detecting a packet collision on the LAN and providing a second output signal in response thereto; and
   providing a late-collision output indication when said second output signal indicates the occurrence of a packet collision subsequent to the elapse of a predetermined time interval from the start of the last preceding packet as indicated by said first output signal.

* * * * *

UNITED STATES PATENT AND TRADEMARK OFFICE
CERTIFICATE OF CORRECTION

PATENT NO. : 5,329,519
DATED : July 12, 1994
INVENTOR(S) : Colin S. I'Anson

It is certified that error appears in the above-indentified patent and that said Letters Patent is hereby corrected as shown below:

ON THE TITLE PAGE item "[86] PCT No.: PCT/GB91/01952", please change

371 Date:   Jul. 1, 1993

102(e) Date:   Jul. 1, 1992"

to read

371 Date: June 1, 1993

102(e) Date: June 1, 1993 --.

Column 1, line 29, change "erases" to --ceases --.

Column 4, line 17, change "LAIN" to --LAN--.

Signed and Sealed this

Eighth Day of November, 1994

Attest:

BRUCE LEHMAN

Attesting Officer      Commissioner of Patents and Trademarks